United States Patent [19]

Johnson

[11] Patent Number: 5,033,280
[45] Date of Patent: Jul. 23, 1991

[54] SECURITY LOCK

[76] Inventor: James B. Johnson, 2610 U.S. 31 S., Niles, Mich. 49120

[21] Appl. No.: 449,105

[22] Filed: Dec. 7, 1989

Related U.S. Application Data

[63] Continuation of Ser. No. 165,592, Mar. 8, 1988, abandoned.

[51] Int. Cl.$^5$ ............................................. F16B 41/00
[52] U.S. Cl. ........................................ 70/232; 70/178; 70/455
[58] Field of Search .................................. 70/158–162, 70/164, 166–169, 175–180, 232, 455

[56] References Cited

U.S. PATENT DOCUMENTS

| | | |
|---|---|---|
| 105,105 | 7/1870 | McIlhenny . |
| 725,290 | 4/1903 | Speer ................................. 70/178 X |
| 795,952 | 8/1905 | Angeloni et al. . |
| 1,620,051 | 3/1927 | Zito ........................................ 70/178 |
| 1,829,444 | 10/1931 | Goebel et al. ..................... 70/178 X |
| 2,048,424 | 7/1936 | Caldwell ............................... 70/232 |
| 2,656,706 | 10/1953 | Lucas et al. ........................... 70/232 |
| 3,181,523 | 5/1965 | Casey .................................... 70/232 |
| 3,245,240 | 4/1966 | DeForrest ....................... 70/232 X |
| 3,269,159 | 8/1966 | Young ................................... 70/232 |
| 3,284,121 | 11/1966 | Lyon ................................ 70/232 X |
| 3,756,047 | 9/1973 | Mulberry ............................. 70/164 |
| 4,118,962 | 10/1978 | Block et al. ...................... 70/423 X |
| 4,300,373 | 11/1981 | Camos et al. ........................ 70/232 |
| 4,399,593 | 8/1983 | De Bradandere . |
| 4,405,161 | 9/1983 | Young et al. ..................... 70/232 X |
| 4,428,211 | 1/1984 | Hermann ......................... 70/455 X |
| 4,541,256 | 9/1985 | Green .................................. 70/232 |
| 4,557,024 | 12/1985 | Roberts et al. . |
| 4,676,084 | 6/1987 | Signorelli ........................ 70/455 X |
| 4,803,858 | 2/1989 | Parker ............................. 70/178 X |

FOREIGN PATENT DOCUMENTS

| | | | |
|---|---|---|---|
| 2561291 | 9/1985 | France ................................. 70/455 |
| 123310 | 9/1927 | Switzerland ........................ 70/178 |

Primary Examiner—Gary L. Smith
Assistant Examiner—Suzanne L. Dino
Attorney, Agent, or Firm—Barnes & Thornburg

[57] ABSTRACT

A security lock for detachably securing a hose fitting includes two hinged members connected by a lock. The hinge members surround the hose fitting. The lock is compact to fit in small areas. The lock is used for securing watering systems on recreational vehicles.

23 Claims, 4 Drawing Sheets

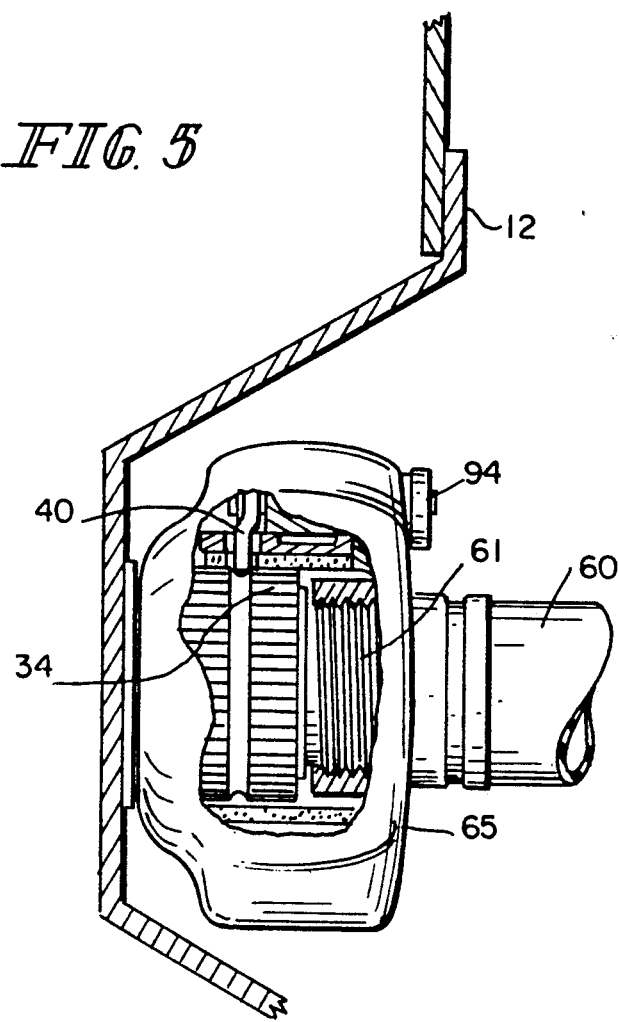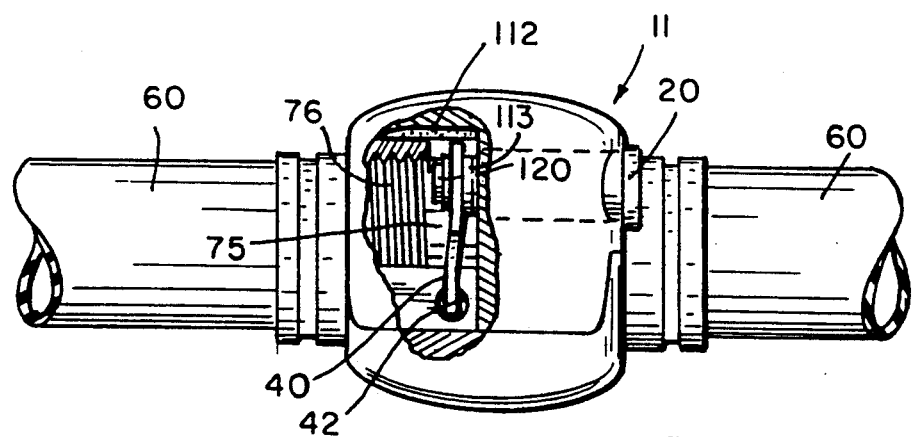

SECURITY LOCK

This application is a continuation of application Ser. No. 07/165,592, filed Mar. 8, 1988 and now abandoned.

BACKGROUND AND SUMMARY OF THE INVENTION

The present invention relates generally to security locks for water hose fittings of water systems, primarily on recreational vehicles. The independent lock, contoured to fit small openings and restricted areas of recreational vehicles, is used to secure a cap to the water system of the vehicle or a hose to the vehicle or a hose to a spigot or two hoses together.

Previously, locks have been incorporated into the wall section of only a very few recreational vehicles to prevent tampering with the water supply. However, when these recreational vehicles are connected to a hose, there is no protection at the spigot from subversives contaminating the water supply. A lock incorporated into the wall of the vehicle only prevents vandalism when the recreational vehicle is operating as a closed system.

Various locking caps have also been used for securing gas caps to vehicles. This locking cap is limited to securing the cap on the tank. These locks are designed for a different purpose then that of the present invention.

Systems which have openings to allow a hose to connect to an inner portion of the vehicle prevent access to the vehicle end of the system. However, vandals can still contaminate the water supply by simply removing the hose from the spigot and inserting contaminants into the system. In order to be adequately protected, it is necessary to secure an entire watering system.

Various pipe coupling looks have been utilized to secure plumbing pipe sections together. For example, U.S. Pat. No. 105,105, patented on July 5, 1870, discloses a hinged locking arrangement for a pipe system. However, this locking mechanism is large and heavy and would not fit into many locations on the recreational vehicles. Furthermore, pipe couplings require different design criteria than that associated with water supply systems in recreational vehicles.

U.S. Pat. No. 795,952 to Angelenio et al. is another example of a pipe coupling system for use with rigid coupling systems.

Additionally, various hose clamps have been invented which permanently lock two flexible hoses to one another via a ridge pipe connector. An example of this type of hose clamp is disclosed in U.S. Pat. No. 4,399,593. These clamps do not utilize a releasable locking mechanism to prevent tampering. These clamps are not reusable to the extent of the present invention and serve a different function.

It is, therefore, an object of the present invention to provide an improved locking device for hose-like fittings.

Another object is to provide a locking device which is small in size to fit into various recreational vehicle recessed water inlet housing.

It is a further object to provide a locking device designed to the needs of water hose fittings.

Yet another object is to provide a locking device with a hinge pin mechanism hidden from the outside surface.

Still another object is to provide a locking mechanism of anti-rusting material.

Yet still another object is to provide a locking mechanism with a dust cover to prevent accumulation of particulate matter in the locking means.

Yet still another object is the provision of an anti-rattling material on the interior surface of the locking mechanism.

Yet another object is to provide a mechanism that would exclude subversives from tampering with crucial water supplies on land and marine recreational vehicles.

Yet another object is to provide a device that minimizes the theft of garden hoses and hose accessories.

Yet another object is to provide a locking mechanism which can be provided on numerous locations in the watering system, including but not limited to: connecting a hose to a vehicle; connecting a hose to a spigot; connecting one hose to another hose; and securing a dust cap on the water inlet of a recreational vehicle.

These and other objects of the present invention are attained in the provision of a security lock detachably secured to the exterior of a hose fitting, particularly in connecting a water supply to a recreational vehicle. Two hinged components are connected to one another utilizing a locking means. The two hinged portions enclose the hose coupler by providing an annular housing surrounding the coupling connection. The locking mechanism is designed for minimum size and weight and contoured to fit into recreational vehicles' recessed water housing units. This multi-purpose lock is usable at numerous locations in the watering system and also restricts theft of an exterior water hose and its accessories.

Other objects, advantages and novel features of the present invention will become readily apparent upon consideration of the following description in conjunction with the drawings.

BRIEF DESCRIPTION OF THE DRAWINGS

FIG. 5 is a side view of the security lock with portions broke away illustrating a water hose connecting to the side of a recreational vehicle.

FIG. 6 is a side view with portions broken away of the security lock securing two hoses to one another.

DETAILED DESCRIPTION OF THE DRAWINGS

Figure 1:
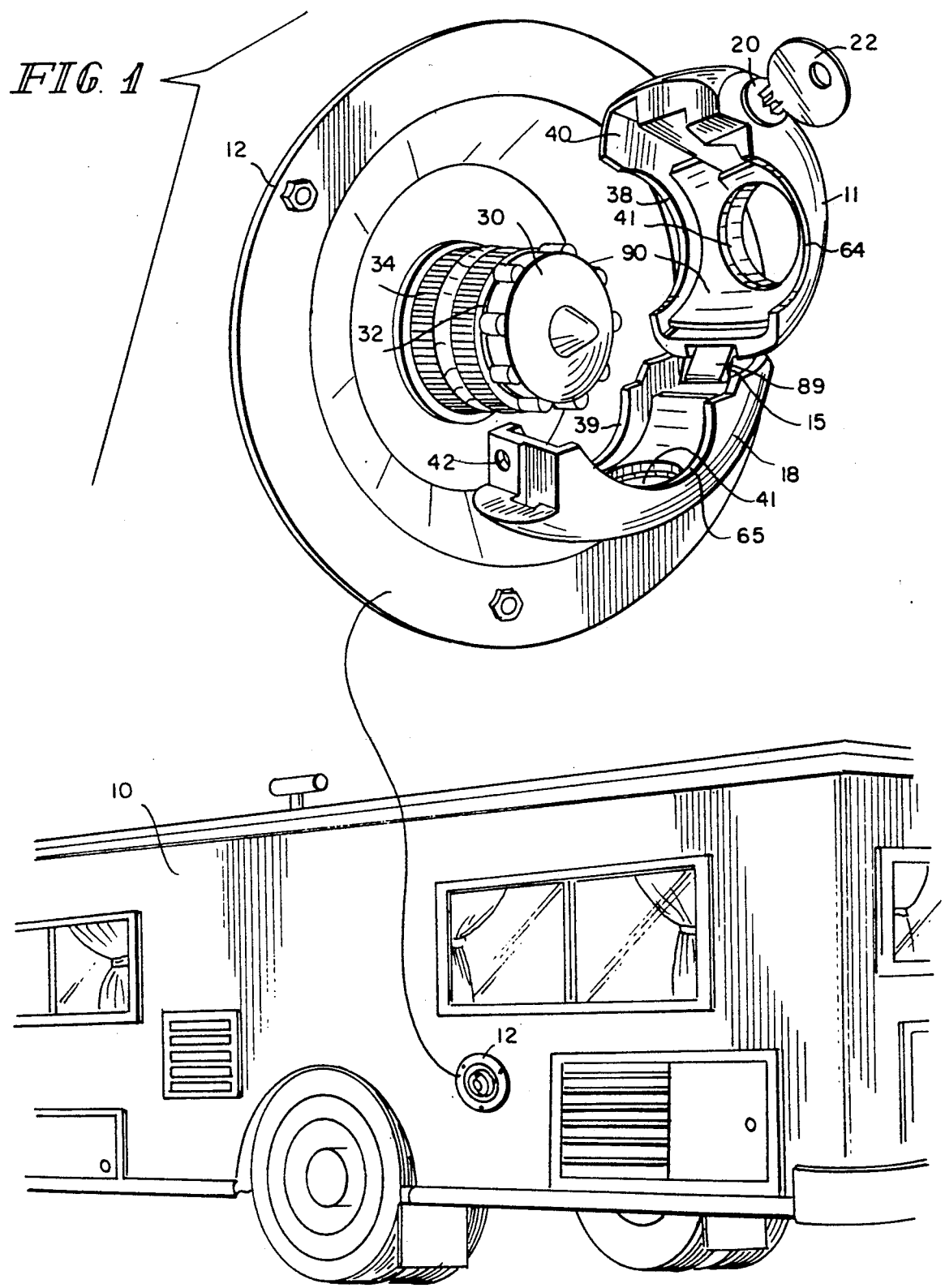
FIG. 1 is a blown-up perspective view of a recreational vehicle recessed water housing with a security lock in an unlocked position ready to be placed over the dust cap.
Figure 4:
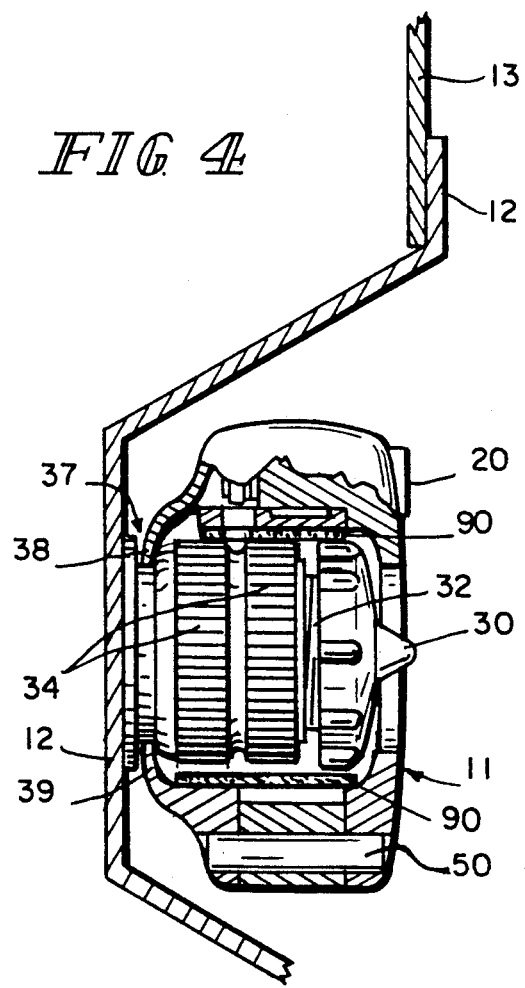
FIG. 4 is an expanded side view with portions broken away of the security lock securing a dust cap to the water system of a recreational vehicle.

FIG. 1 illustrates the recessed water housing of a recreational vehicle 10. A housing 12 is securedly fastened to a wall of the recreational vehicle 10. The housing 12 is configured to be indented into the wall 13 of the recreational vehicle, as seen in FIG. 4. This indentation restricts the area for the security lock 11 to be attached and hold the dust cover 30 or hose 60 securely in place.

Security lock 11 includes a hinge means 15 which pivotably connects first member 16 to second member 18. A keyed lock assembly 20 is incorporated into the first member 16. In a preferred embodiment key 22 operates the locking assembly 20.

Water inlet dust cap 30 includes a stem portion 32 which is threadably engaged into an internal threaded hose connector 34 attached to the water system of the vehicle. Hose connector 34 includes a recessed area 37 between connector 34 and the vehicle. Recessed area 37 is a ridge for holding lock 20 in proper position.

Ridges 38 and 39 formed on the back outside surfaces of members 16 and 18 respectively are designed to surround the internal threaded hose connector and fixedly secure security lock 11 to the recreational vehicle 10 by connection with recessed area 37. Water dust cap 30 is thereby fixedly secured onto the recreational vehicle 10.

Latch 40 is connected to lock assembly 20 and is rotatable by key 22. The latch is connected on first member 16 of lock 11. Opening 42 for operation with latch 40 is provided in second member 18. When security lock 11 is closed around a desired hose coupler and key 20 is properly turned in a predetermined direction, latch 40 will communicate with opening 42 used as a latch or catch means to secure member 16 to member 18. Member 16 and 18 are locked to form an annular coupling.

A preferred embodiment of lock 11 includes openings 41. These openings 41 allow fluid to easily drain from the lock. Additionally, the openings allow dust covers with prongs to be secured to the system. The prongs protrude outwardly through the openings 41.

Figure 2:
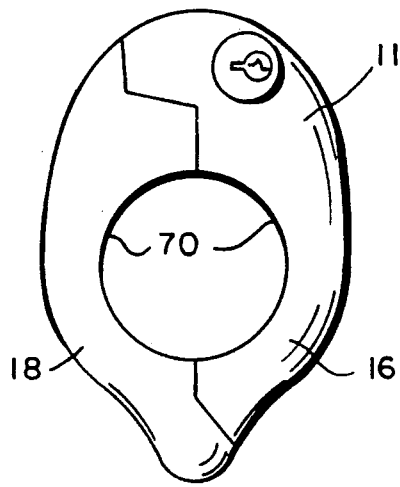
FIG. 2 is a front view of the security lock in a locked position.

FIG. 2 is a front view of security lock in a closed position with key 20 removed. The location of hinge means 15 cannot be easily determined from viewing the lock as seen in FIG. 2. This is due to the material being smooth in order to cover the location of hinge pin 50.

Figure 3:
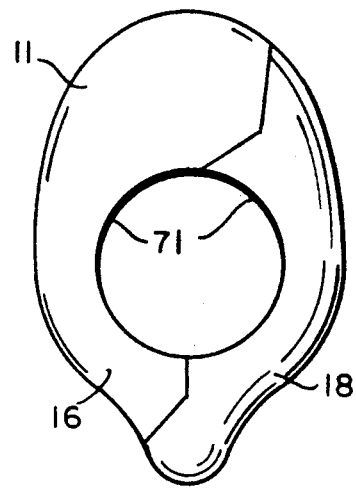
FIG. 3 is a rear view of the security lock in a locked position.

FIG. 3 is a back view of security lock 11 with a smooth finish shown throughout.

FIG. 4 illustrates the use of security lock 11 to hold a water dust cap to the recreational vehicle. It can be seen that ridges 38 and 39 securely hold the security lock onto the recreational vehicle. It can be appreciated that dust cap 30 must be rotated to a desired location in order for security lock 11 to surround the cap. This aspect ensures that the cap will be properly tightened and secured to the vehicle. In other words, the cap must be in proper position for the security lock to be attached to the vehicle. The dust cap cannot pass thru annular surfaces 64 and 65 even if it is loose. The indentation of the recreational vehicle recessed water housing requires a compact design of the lock.

FIG. 5 is a side view with portions broken away of the security lock attached to the side of a motor vehicle whereby a hose 60 with an external threaded portion 61 is locked in proper position on a motor vehicle. As seen in FIGS. 1 and 5, ridges 64 and 65, on opposite exterior surfaces than ridges 38 and 39 of the lock, have a radial dimension smaller than that of the external threaded portion 61 of hose 60. In other words, a subversive trying to simply turn the hose out of the locking mechanism would be prevented since the threaded portion of the hose has a larger diameter than the radial dimension 70 formed by ridges 64 and 65. The ridges therefore prevent unauthorized removal of the hose from the recreational vehicle.

In other words, the dimensions of the radial opening 70 and 71 are designed to be less than that of a water hose fitting used in all standard home type and in the recreational vehicle industry. The radial dimension 70 and 71 can be modified to incorporate a specific design for other sizes. Openings 70 and 71 are the smallest circumferences of security lock 11. It is further contemplated that a smaller or larger hose fitting could be provided utilizing the same basic concepts of the invention.

FIG. 6 illustrates the use of security lock 11 securing two hoses 60 to one another. The portions broken away show latch 40 engaged in opening 42. Internal threaded hose connector 75 is shown in the portion broken away connected to an external threaded hose connector 76.

Figure 7:
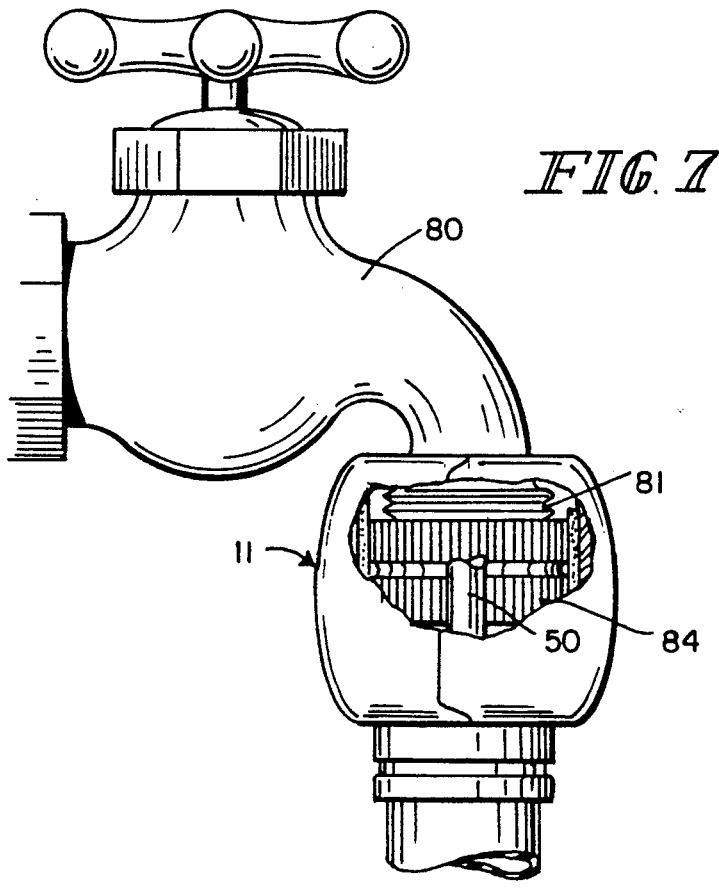
FIG. 7 is a side view with portions broken away of the security lock in a locked position connecting a water hose to a watering spigot.

FIG. 7 shows a security lock attaching a hose to a spigot 80. The spigot 80 includes external threaded connector 81 connecting to internal threads 84 of hose connector 60. In the portion broken away, hinge pin 50 is shown.

Figure 8:
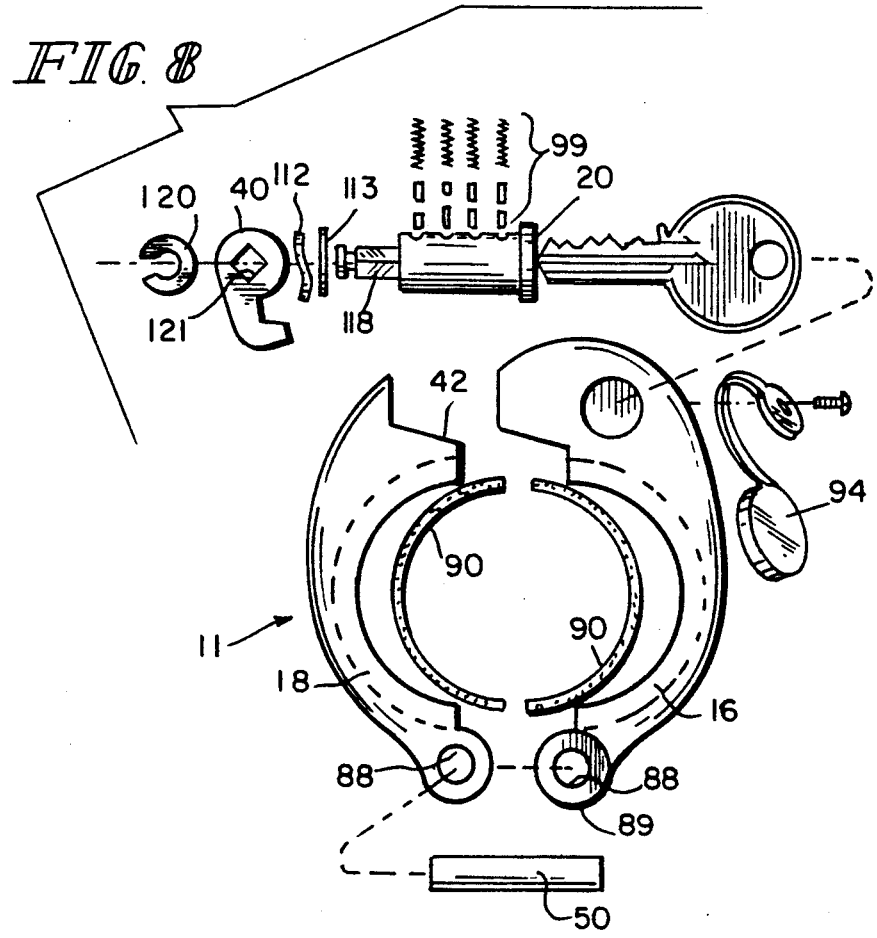
FIG. 8 is an exploded view of the locking device detailing the various components.

FIG. 8 is an exploded view to illustrate a preferred locking mechanism associated with the security lock 11. Specifically, first member 16 is connected to second member 18 utilizing pin 50. Openings 88 are designed to allow pin 50 to be inserted therein. Portion 89 extends outward from first member 16 and is connected to second member 18 via pin 50. In other words, first member 16 has an extended portion 89 which is inserted into the second member whereby pin 50 pivotably connects the two members to one another.

After pin 50 has been inserted into openings 88, a finishing step is provided to cover the opening of pin 50 thereby securing the outside portion of member 18 and covering the opening of 18 to enclose pin 50 in the security lock. For this reason, the preferred embodiment such as seen in FIG. 2 does not show opening 88.

An anti-rattling means 90 is secured to the internal portions of members 16 and 18 through any suitable securing means. A gluing mechanism has been found to work well in a preferred embodiment. The specific anti-rattling means can be any soft flexible material. A preferred embodiment has found an open cellular material to be advantageous.

Dust cover 94 can be connected to cover the opening for key 22 in locking means 20. Dust cover 94 can be of any suitable material and a preferred embodiment can be attached directly to the locking means. In the preferred embodiment, the dust cover simply is dangling from the security lock 11 when the key is in place for operation. An internal lock shield is also contemplated in some embodiments.

A preferred locking mechanism 20 is illustrated in FIG. 8. Any locking means associated with an interior opening is contemplated to be used in the invention. Lock assembly 20 shows a particular four-pinned lock provided by a lock manufacturer. A three-pinned or other lock could also be used. Specifically, four lock pins 99 are connected as part of lock mechanism 20. A spacer 113 is then inserted following the locking pins 99. A tension washer 112 holds the spacer and lock mechanism into position. A lock pawl or a latch 40 is then connected onto arm 118. A spring clip means 120 is then used to hold latch 40 into position. Spring clip 120 can be a standard C-type clip used to fixedly secure the pawl in a proper position. Arm 118 can be configured in such a way to fixedly retain latch 40 in proper position.

Latch 40 is shown with a square opening 121. Arm 118 is designed to fit snugly in opening 121 of latch 40.

The small insertable keyed lock can be easily replaced for repair or replacement should the key be lost or damaged. It is contemplated that one key could be used for a plurality of security locks for the convenience of the operator. Thus, the operator would only have one key to securely fasten the entire watering system from the spigot through a series of hoses and finally into the recreational vehicle. The streamlined lock provides a neat, yet strong and efficient means to prevent vandals from contaminating the water supply to a recreational vehicle. If subversives are unsuccessful, damage to lock 20 or security lock 11 indicates tampering with the system.

In general, the security lock is small enough and contoured to fit into a recreational vehicle recessed housing and is designed to fit the needs of water hose fittings. Additional uses are contemplated with similar types of fittings, for example, locking nuts on studs for a variety of industries.

Although the present invention has been described in detail, the same is by way of illustration and example only and is not to be taken by way of limitation. The spirit and scope of the present invention are to be limited only by the terms of the appended claims.

What is claimed is:

1. A security lock for preventing unauthorized access to a recreational vehicle water system to which a water inlet dust cap is secured at a desired location to a coupling connection attached to the water system which has a recessed area between the coupling connection and the vehicle, the security lock comprising:
    (a) a first member with a hinge means;
    (b) a second member connected to the first member at the hinge means;
    (c) a locking means for fixedly securing the first and second members together to form a substantially annular member for surrounding the water inlet dust cap and the coupling connection;
    (d) a first exterior surface means of the annular member having a smaller radial dimension than the coupling connector for engaging the recessed area between the coupling connector and the vehicle and for preventing removal of the annular member when closed around the coupling connection; and
    (e) a second exterior surface means of the annular member having a smaller radial dimension than the coupling connector opposite to and spaced from the first exterior surface means by a predetermined distance for permitting the annular member to surround the water inlet dust cap and coupling connector only when the water inlet dust cap is properly secured to the coupling connector at the desired location and for limiting movement of the water inlet dust cap within the annular member.

2. A security lock according to claim 1, wherein the locking means is a key-type lock in the first member and a catch means in the second member for fixedly securing the first member to the second member.

3. A security lock according to claim 2, wherein the hinge means is a pin.

4. A security lock according to claim 3, wherein the pin is hidden from view by the said first member having a smooth casting plug means provided therein.

5. A security lock according to claim 4, wherein anti-rattle means are provided on interior portions of the annular member.

6. A security lock according to claim 5, wherein the anti-rattle means is a foam-type cellular material.

7. A security lock for preventing unauthorized access to a recreational vehicle water system to which a coupling is secured at a desired location to a coupling connection attached to the water system which has a recessed area between the coupling connection and the vehicle, the security lock comprising:
    (a) a first member with a hinge means;
    (b) a second member connected to the first member at the hinge means;
    (c) a locking means for fixedly securing the first and second members together to form a substantially annular member for surrounding the coupling and the coupling connection;
    (d) a first exterior surface means on the annular member having a smaller radial dimension than the coupling connector for engaging the recessed area between the coupling connector and the vehicle and for preventing removal of the annular member enclosed around the coupling connection; and
    (e) a second exterior surface means on the annular member having a smaller radial dimension than the coupling connector opposite to and spaced from the first exterior surface means by a predetermined distance for permitting the annular member to surround the coupling and coupling connector only when the coupling is properly secured to the coupling connector at the desired location and for limiting movement of the coupling within the annular member, wherein said second exterior surface means of the annular member has an aperture formed therethrough.

8. A security lock according to claim 7 wherein the coupling is a fitting of a hose and the aperture is sized to prevent removal of the hose fitting and passage of a conduit of the hose.

9. The security lock according to claim 7, wherein the locking means is a key-type lock in the first member and a catch means in the second member for fixedly securing the first member to the second member.

10. A security lock according to claim 9, wherein the opening is positioned intermediate the first exterior surface means and the second exterior surface means.

11. The security lock according to claim 9, wherein the hinge means is a pin.

12. The security lock according to claim 11, wherein the pin is hidden from view by the said first member having a smooth casting plug means provided therein.

13. The security lock of claim 7, wherein anti-rattle means are provided on interior portions of the annular member.

14. The security lock of claim 13, wherein the anti-rattle means is a foam-type cellular material.

15. The security lock of claim 7, wherein the coupling is a water inlet dust cap.

16. A security lock for preventing unauthorized access to a recreational vehicle water system to which a coupling is secured at a desired location to a coupling connection attached to the water system which has a recessed area between the coupling connection and the vehicle, the security lock comprising:
    (a) a first member with a hinge means;
    (b) a second member connected to the first member at the hinge means, wherein at least one of said first and second members includes an opening to allow fluid to drain from said security lock;

(c) a locking means for fixedly securing the first and second members together to form a substantially annular member for surrounding the coupling and the coupling connection;

(d) a first exterior surface means on the annular member having a smaller radial dimension than the coupling connector for engaging the recessed area between the coupling connector and the vehicle and for preventing removal of the annular member enclosed around the coupling connection; and (e) a second exterior surface means on the annular member having a smaller radial dimension than the coupling connector opposite to and spaced from the first exterior surface means by a predetermined distance for permitting the annular member to surround the coupling and coupling connector only when the coupling is properly secured to the coupling connector at the desired location and for limiting movement of the coupling within the annular member.

17. The security lock according to claim 16, wherein the locking means is a key-type lock in the first member and a catch means in the second member for fixedly securing the first member to the second member.

18. The security lock according to claim 17, wherein the hinge means is a pin.

19. The security lock according to claim 18, wherein the pin is hidden from view by the said first member having a smooth casting plug means provided therein.

20. The security lock of claim 16, wherein anti-rattle means are provided on interior portions of the annular member.

21. The security lock of claim 20, wherein the anti-rattle means is a foam-type cellular material.

22. The security lock of claim 16, wherein the coupling is a water inlet dust cap.

23. The security lock of claim 22, wherein the second exterior surface means of the annular member has an aperture formed therethrough.

* * * * *